US012266864B1

(12) United States Patent
West et al.

(10) Patent No.: US 12,266,864 B1
(45) Date of Patent: Apr. 1, 2025

(54) WIDE-SCAN PLANAR ARRAY RADIATING ELEMENT

(71) Applicant: Rockwell Collins, Inc., Cedar Rapids, IA (US)

(72) Inventors: James B. West, Cedar Rapids, IA (US); Jiwon L Moran, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 415 days.

(21) Appl. No.: 17/964,588

(22) Filed: Oct. 12, 2022

(51) Int. Cl.
*H01Q 5/30* (2015.01)
*H01Q 3/24* (2006.01)
*H01Q 9/04* (2006.01)
*H01Q 21/06* (2006.01)

(52) U.S. Cl.
CPC ......... *H01Q 21/067* (2013.01); *H01Q 9/0407* (2013.01)

(58) Field of Classification Search
CPC ........................... H01Q 21/067; H01Q 9/0407
See application file for complete search history.

(56) References Cited

U.S. PATENT DOCUMENTS

| | | | | |
|---|---|---|---|---|
| 4,425,567 | A | 1/1984 | Tresselt | |
| 10,686,251 | B2 | 6/2020 | Shapoury | |
| 11,329,375 | B1 * | 5/2022 | West | H01Q 23/00 |
| 2013/0214972 | A1 | 8/2013 | Woodell et al. | |
| 2018/0301808 | A1 * | 10/2018 | Olsen | H01Q 21/0025 |
| 2018/0358696 | A1 | 12/2018 | Shapoury | |

OTHER PUBLICATIONS

Kedar et al., "Wide Beam Tapered Slot Antenna for Wide Angle Scanning Phased Array Antenna," Progress In Electromagnetics Research B, vol. 27, 235-251, 2011. doi:10.2528/PIERB10100508.

Williams, John S., "Electronic Scanned Array Design", in The 46th European Microwave Conference, 2016, 128 pages.

* cited by examiner

*Primary Examiner* — Minh D A
(74) *Attorney, Agent, or Firm* — Suiter Swantz IP

(57) ABSTRACT

An ESA includes radiating elements having a normal mode radiating element and a superimposed end-fire mode radiating element. The combined normal mode radiating element and and-fire mode radiating element attenuators or variable gain amplifiers for amplitude adjustment, phase shifting, and time delay circuitry and algorithms to drive the normal mode radiating element and end-fire mode radiating element simultaneously to produce radiation patterns that constructively interfere. Alternatively, the radiating elements are fed by a radio frequency (RF) feed and switching integrated circuitry timed to drive the normal mode radiating element and end-fire mode radiating element to effectively produce hemispherical radiation patterns as a function or time/scan angle.

20 Claims, 3 Drawing Sheets

WIDE-SCAN PLANAR ARRAY RADIATING ELEMENT

BACKGROUND

Conventional active electronically scanned array (ESA) antennas cannot scan to the horizon because of the $\cos^n(\theta)$ nature of conventional radiating elements; as the angle $\theta$ (i.e., as the scan angle approaches the horizon) gain approaches $-\infty$ dB as compared to peak beam strength at the zenith. Convention end-fire arrays scan toward the horizon but have extremely poor gain or even null at the zenith. End-fire arrays are phased differently to normal mode arrays.

Existing solutions for horizon-to-horizon scanning with ESAs require multiple panels with corresponding greater costs. It would be advantageous to have a single radiating element in a single panel ESA that can produce useful gain from beam zenith to the horizon.

SUMMARY

In one aspect, embodiments of the inventive concepts disclosed herein are directed to an ESA with radiating elements having a normal mode radiating element and a superimposed end-fire mode radiating element. The combined normal mode radiating element and and-fire mode radiating element produce a hemispherical radiation pattern.

In a further aspect, feed layer circuitry may employ attenuators or variable gain amplifiers for amplitude adjustment, phase shifting, and time delay circuitry and algorithms to drive the normal mode radiating element and end-fire mode radiating element simultaneously to produce radiation patterns that constructively interfere through complex summation of the two adjusted radiation patterns.

In a further aspect, the radiating elements are fed by a radio frequency (RF) feed and switching integrated circuitry timed to drive the normal mode radiating element and end-fire mode radiating element to effectively produce hemispherical radiation patterns as a function or time/scan angle.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
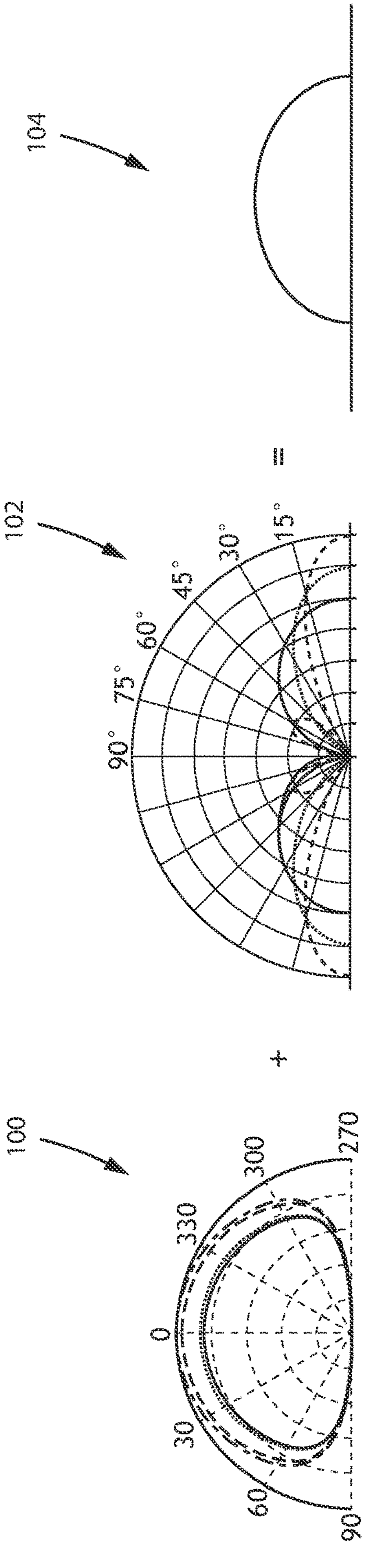
FIG. 1 shows radiation patterns of a radiating element according to an exemplary embodiment.

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of a feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed to an ESA with radiating elements having a normal mode radiating element and a superimposed end-fire mode radiating element. The combined normal mode radiating element and and-fire mode radiating element produce a hemispherical radiation pattern. In one aspect, feed layer circuitry may employ attenuators or variable gain amplifiers for amplitude adjustment, phase shifting, and time delay circuitry and algorithms to drive the normal mode radiating element and end-fire mode radiating element simultaneously to produce radiation patterns that constructively interfere. Alternatively, the radiating elements are fed by a radio frequency (RF) feed and switching integrated circuitry timed to drive the normal mode radiating element and end-fire mode radiating element to effectively produce hemispherical radiation patterns as a function or time/scan angle.

Referring to FIG. 1, radiation patterns of a radiating element according to an exemplary embodiment are shown. Normal mode radiating elements typical of ESA antennas produce a normal mode radiation pattern 100 with peak radiation is normal to the aperture and little or no gain to the horizon. As the beam is electronically steered, normal mode radiating elements work best when pointing straight up, but at the horizon the array functions poorly.

End-fire mode radiating elements produce an end-fire mode radiation pattern 102 with peak radiation at the horizon and little or no gain at the zenith. End-fire mode radiating elements work best when pointing straight at the horizon, but function poorly when pointing normal to the aperture.

It would be advantageous to have a single radiating element, or composite radiating element, that could produce a composite radiation pattern 104 that exhibits the properties of both the normal mode ESA and an end-fire mode ESA. Such composite radiation pattern 104 enables operations with a planar ESA that are theoretically impossible otherwise.

Figure 2:
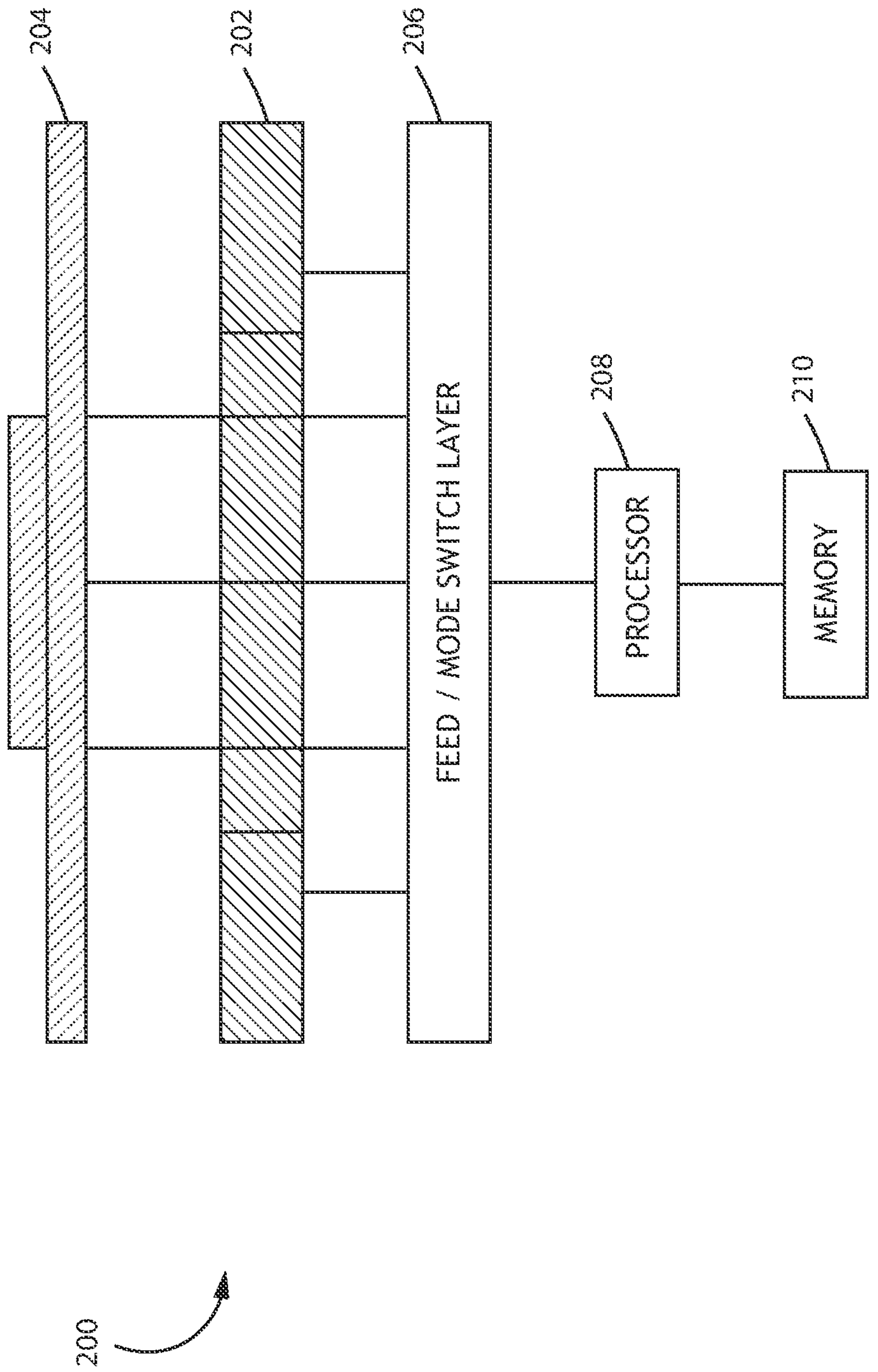
FIG. 2 shows a block diagram of a system for implementing embodiments.

Referring to FIG. 2, a block diagram of a system for implementing embodiments is shown. The system includes an array of radiating elements 200. Each radiating element 200 comprises a normal mode element 202 and an end-fire mode element 204. The normal mode element 202 and end-fire mode element 204 may be substantially coincident (e.g., the end-fire mode element 202 may be superimposed onto the normal mode element 202) and fed by corresponding feed layer circuitry 206. In at least one embodiment, the array of radiating elements 200 comprise an ESA, coordinated via phase shifted signals from the feed layer circuitry 206 and/or a processor 208 configured via memory 210 storing processor executable code.

In at least one embodiment, the feed layer circuitry 206 may be configured to blend radiation patterns of the normal mode element 202 and the end-fire mode element 204. The feed layer circuitry 206 may apply signals to the normal mode element 202 and end-fire mode element 204 so that the corresponding radiation patterns produce a composite radiation pattern as in FIG. 1 via constructive interference by means of complex signal summation (amplitude, phase time delay). While the representation of the composite radiation pattern generally comprises signal amplitudes, it may be appreciated that producing such constructive interference may require complex phase shifting. While a simple summation of radiation pattern amplitudes may generally correspond to the composite radiation pattern, the phases of the normal radiation pattern and end-fire radiation pattern may destructively interfere.

The processor 208 or feed layer circuitry 206 may be configured to produce and/or calculate signals to apply to the normal mode element 202 and end-fire element 204 to produce individual radiation patterns that constructively interfere to produce the composite radiation pattern. The feed layer circuitry 206 may comprise a phase transfer network between the normal mode element 202 and end-fire mode element 204. In at least one embodiment, the processor 208 may enable a machine learning algorithm (e.g., a trained neural network) configured to associate input signals to feed layer outputs to produce signals, each having an amplitude and phase shift, for the normal mode element 202 and end-fire mode element 204 to produce a composite radiation pattern via constructive interference. Phase shift may be spatially dependent (different for radiation elements 200 across the array).

In at least one embodiment, the processor 208 may implement a time division multiplexed architecture wherein one of the end fire or normal mode elements is energized at any moment of time. Switching between end-fire mode and normal mode is a function of scan. Typically, there will be a scan angle where the ESA switches from the end-fire mode to the normal mode and vice versa. In at least one embodiment, the processor 208 and/or feed layer circuitry 206 may continuously monitor the current scan angle of the radiating element 200 and switch certain feed circuitry between driving the normal mode element 202 and the end-fire mode element 204 whenever the scan angle exceeds some threshold value. For example, the processor 208 and/or feed layer circuitry 206 may be configured to scan from horizon to horizon. The feed layer circuitry 206 may switch from driving the normal mode element 202 to driving the end-fire mode element 204 whenever the scan angle exceeds 70° off the boresight. In a least one embodiment, different threshold values may be employed depending on whether the scan angle is increasing or decreasing with respect to the boresight or horizon. The radiating element 200 thereby produces a composite radiation pattern as a function of time as it relates to scan angle.

The threshold may be defined according to known system properties including features of the radiating element 200 and the feed layer circuitry 206. Alternatively, the processor may dynamically determine the threshold based on a real-time analysis of return signal quality during normal operation or during some initial or periodic calibration.

In at least one embodiment, wire-type end-fire radiating elements 204 may be disposed on a low dielectric carrier grid sitting atop the normal mode radiating element 202/aperture. In at least one embodiment, the dielectric layers may be stratified. Some printed radiating elements 202, 204 may require different dielectric constants. Alternatively, one dielectric layer may include bore holes to alter the dielectric constant locally.

Several microstrip antenna variants have nulls/printed circuit board removal in a center region. Wire-type elements are generally defined by operating frequency; as operating frequency increases, the length of the wire decreases. E.g., in the middle of the X band, wire length may be ¼ inch tall, while at one GHz, the wire length may be 3 inches. Embodiments of the present disclosure may be convenient in the X to KU bands. There are techniques that may facilitate operation in different frequency ranges. E.g., a wire may be coiled within the empty ring space of a normal mode radiating element, the wire may be inductively loaded, etc. Such techniques may make operation practical within the L band, K band, etc.

The feed layer circuitry 206 may comprise one or more radio frequency (RF) switches. Modern RF integrated circuit (RFIC) beam former technology enables dynamic switching of phase commands between normal mode radiation and end-fire mode radiation in tens of microseconds. Phase shifts may be different across an entire array, and phase shifters time delays may be reset when switching from the normal mode to the end-fire mode. RF integrated circuit beamformers have resident buffered memories that could be preloaded phase shift values and time delays according to operational mode and scan angle.

Figure 3:
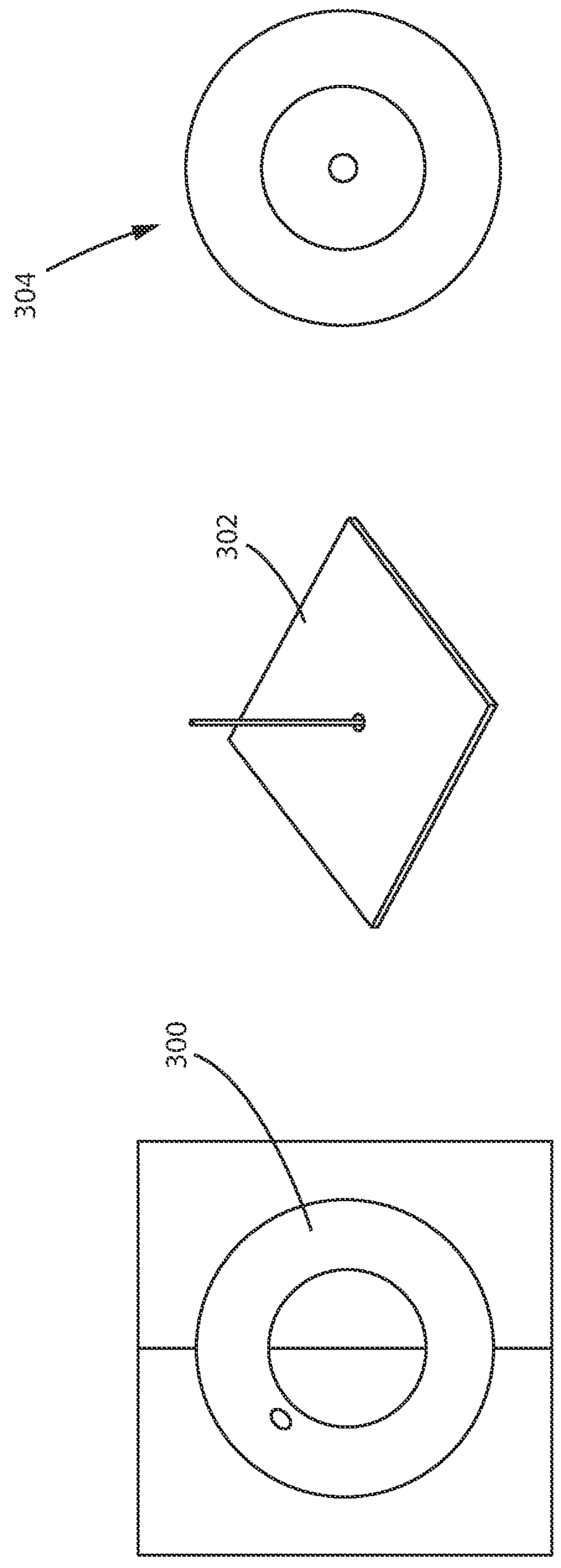
FIG. 3 shows components of a radiating element according to an exemplary embodiment.

Referring to FIG. 3, components of a radiating element 304 according to an exemplary embodiment are shown. The radiating element 304 includes a normal mode radiating element 300 and an end-fire mode radiating element 302. The normal mode radiating element 300 may comprise a reduced surface wave (RWS) antenna embodied in a center-shorted annular ring antenna with unused space in the middle of the ring. Microstrip patch variants (e.g., printed adiating elements) with voids in the middle region may be used. Also, a pin could be the outer conductor of a coaxal type feed for a wire antenna element shorted patch. The fundamental mode of radiation is the same as for a circular patch antenna. Linear polarization (LP) and circular polarization (CP) are both possible. A feed layer may be configured leaving the center region hollow for integration with the end-fire mode radiating element 302 without perturbing the normal mode radiating element 300.

In at least one embodiment, an antenna array of such radiating elements 300 may be doubly curved/conformal. The antenna array may be manufactured via exotic manufacturing (e.g., 3D additive manufacturing).

In at least one embodiment, the normal mode radiating element 300 and end-fire mode radiating element 302 may comprise microstrip patches. Microstrip patches can be excited in higher resonant modes to achieve "monopole-like" end-fire radiation. For example, the TM41 mode functional for a low-angle vertically polarized radiation pattern. The balanced nature of 4-feed quadrature tends to suppress higher ordered asymmetric modes.

For omnidirectional applications it is possible to superimpose two patch antennas of the TM11 and TM41 modes via active combiner (with amplifier gain), if non-phase center coincidence is tolerable in terms of systems requirements.

Embodiments of the present disclosure enable integrating two unique printed radiating elements as a part of a multi-layer RF PCB. Integrating monopole end-fire radiating elements (e.g., wire-type radiating elements) with normal mode radiating elements. The $\cos^n(\theta)$ scan loss of planar arrays may be addressed with a single, hybrid normal mode/end-fire mode ESA architectures.

Reactive loading techniques may be able to scale the constitutive RF PCB layers appropriately for multi-layer integration. ESA architectures can utilize some end-fire mode-only radiating elements simultaneously with some normal mode-only radiating elements to add another degree of freedom in array pattern synthesis.

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. An electronically scanned array antenna comprising:
- a plurality of radiating elements, each radiating element comprising a normal mode radiating element and an end fire mode radiating element; and
- a feed layer configured to apply signals to each normal mode radiating element and end-fire mode radiating element,
- wherein each of the plurality of radiating elements produces a gain between 0 and 5 dBi when a scan angle is at a zenith and when the scan angle is at a horizon.

2. The electronically scanned array antenna of claim 1, wherein the feed layer is configured to apply the signals to each normal mode radiating element and each end-fire mode radiating element simultaneously.

3. The electronically scanned array antenna of claim 2, wherein the feed layer is configured to apply phase shifts to each signal such that a normal mode radiation pattern of each normal mode radiating element and an end-fire mode radiation pattern of the corresponding end-fire mode radiating element constructively interfere.

4. The electronically scanned array antenna of claim 1, further comprising at least one processor in data communication with the feed layer and a memory storing processor executable code for configuring the at least one processor to:
- determine a current scan angle;
- drive each normal mode radiating element when the current scan angle is below a threshold; and
- drive each end-fire mode radiating element when the current scan angle is above the threshold.

5. The electronically scanned array antenna of claim 4, wherein the at least one processor is further configured to:
- determine a phase shift for each normal mode radiating element when entering a normal mode; and
- determine a phase shift for each end-fire mode radiating element when entering an end-fire mode.

6. The electronically scanned array antenna of claim 4, further comprising at least one RF switch, wherein the at least one processor is further configured to operate the at least one RF switch according to a time domain multiplexing algorithm to switch between the normal mode radiating element and end fire mode radiating element.

7. The electronically scanned array antenna of claim 1, wherein each normal mode radiating element comprises a center-shorted annular ring.

8. The electronically scanned array antenna of claim 1, wherein each end-fire mode radiating element comprises a wire-type radiating element disposed in a space defined by the normal mode radiating element, wherein the normal mode radiating element comprises a printed radiating element with a center void.

9. The electronically scanned array antenna of claim 8, further comprising a pin shorted patch configured as a coaxial element to drive the wire-type radiating element.

10. A method comprising:
- driving a normal mode radiating element to produce a normal mode radiation pattern; and
- driving an end-fire mode radiating element to produce an end-fire mode radiation pattern,
- wherein:
  - the normal mode radiating element and end-fire mode radiating element are disposed coincident with each other; and
  - the coincident normal mode radiating element and end-fire mode radiating element produces a gain between 0 and 5 dBi when a scan angle is at a zenith and when the scan angle is at a horizon.

11. The method of claim 10, further comprising applying signals to the normal mode radiating element and end-fire mode radiating element simultaneously.

12. The method of claim 11, further comprising applying phase shifts to each signal such that the normal mode radiation pattern and end-fire mode radiation pattern constructively interfere.

13. The method of claim 10, further comprising determining a current scan angle, wherein:

driving the normal mode radiating element when the current scan angle is below a threshold; and driving the end-fire mode radiating element when the current scan angle is above the threshold.

14. The method of claim 13, further comprising:

determining a phase shift for the normal mode radiating element when entering a normal mode; and determining a phase shift for the end-fire mode radiating element when entering an end-fire mode.

15. The method of claim 10, wherein the normal mode radiating element comprises a printed radiating element defining a center void and the end-fire mode radiating element comprises a wire-type radiating element disposed in the center void.

16. A radar system comprising:

an electronically scanned array antenna comprising:

a plurality of radiating elements, each radiating element comprising a normal mode radiating element and an end fire mode radiating element; and a feed layer configured to apply signals to each normal mode radiating element and end-fire mode radiating element, wherein each of the plurality of radiating elements produces a gain between 0 and 5 dBi when a scan angle is at a zenith and when the scan angle is at a horizon.

17. The radar system of claim 16, wherein the feed layer is configured to apply the signals to each normal mode radiating element and each end-fire mode radiating element simultaneously.

18. The radar system of claim 17, wherein the feed layer is configured to apply phase shifts to each signal such that a normal mode radiation pattern of each normal mode radiating element and an end-fire mode radiation pattern of the corresponding end-fire mode radiating element constructively interfere.

19. The radar system of claim 16, further comprising at least one processor in data communication with the feed layer and a memory storing processor executable code for configuring the at least one processor to:

determine a current scan angle;

drive each normal mode radiating element when the current scan angle is below a threshold; and drive each end-fire mode radiating element when the current scan angle is above the threshold.

20. The radar system of claim 19, wherein the at least one processor is further configured to:

determine a phase shift for each normal mode radiating element when entering a normal mode; and determine a phase shift for each end-fire mode radiating element when entering an end-fire mode.

* * * * *